United States Patent
Wang et al.

(10) Patent No.: US 11,762,235 B2
(45) Date of Patent: Sep. 19, 2023

(54) BACKLIGHT MODULE AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhiqiang Wang, Beijing (CN); Fangyu Song, Beijing (CN); Xin Ma, Beijing (CN); Qiuli Wang, Beijing (CN); Jianfeng Yao, Beijing (CN); Chuan Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 298 days.

(21) Appl. No.: 17/265,061

(22) PCT Filed: Mar. 30, 2020

(86) PCT No.: PCT/CN2020/081968
§ 371 (c)(1),
(2) Date: Feb. 1, 2021

(87) PCT Pub. No.: WO2021/195818
PCT Pub. Date: Jul. 10, 2021

(65) Prior Publication Data
US 2022/0113590 A1  Apr. 14, 2022

(51) Int. Cl.
G02F 1/13357   (2006.01)
G02F 1/1335    (2006.01)
G02F 1/017     (2006.01)

(52) U.S. Cl.
CPC .. *G02F 1/133603* (2013.01); *G02F 1/133607* (2021.01); *G02F 1/133614* (2021.01); *G02F 1/01791* (2021.01)

(58) Field of Classification Search
CPC ......... G02F 1/133603; G02F 1/133614; G02F 1/133607
See application file for complete search history.

(56) References Cited

U.S. PATENT DOCUMENTS

2006/0084006 A1* 4/2006 Kang ............. C23C 14/048
430/199
2013/0335677 A1  12/2013 You
(Continued)

FOREIGN PATENT DOCUMENTS

CN   104067164 A   9/2014
CN   105487288 A   4/2016
(Continued)

*Primary Examiner* — Lucy P Chien
(74) *Attorney, Agent, or Firm* — Nath, Goldberg & Meyer; Joshua B. Goldberg

(57) ABSTRACT

A backlight module and a display device are disclosed. The backlight module includes a light emitting element array including a plurality of light emitting elements that emit blue light; a quantum dot film disposed on a light-emergent side of the light emitting element array and having a middle area and an edge area, the edge area surrounding the middle area; and a light conversion layer disposed on the light-emergent side of the light emitting element array, wherein an orthographic projection of the light conversion layer on the quantum dot film is located in the edge area of the quantum dot film, a material of the light conversion layer includes a first light conversion material configured to emit red light under excitation of light from the light emitting element and a second light conversion material configured to emit green light under excitation of light from the light emitting element.

19 Claims, 7 Drawing Sheets

(56) References Cited

U.S. PATENT DOCUMENTS

| 2015/0062963 | A1* | 3/2015 | Meir | G02B 6/005 |
| | | | | 362/606 |
| 2016/0027966 | A1* | 1/2016 | Dubrow | C09K 11/025 |
| | | | | 438/47 |
| 2016/0377786 | A1* | 12/2016 | Ham | G02B 6/0055 |
| | | | | 349/65 |
| 2018/0107063 | A1* | 4/2018 | Mao | G02F 1/133602 |

FOREIGN PATENT DOCUMENTS

| CN | 105676522 A | 6/2016 |
| CN | 105892146 A | 8/2016 |
| CN | 106292057 A | 1/2017 |
| CN | 106569363 A | 4/2017 |
| CN | 110389470 A | 10/2019 |

\* cited by examiner

BACKLIGHT MODULE AND DISPLAY DEVICE

This is a National Phase Application filed under 35 U.S.C. 371 as a national stage of PCT/CN2020/081968, filed Mar. 30, 2020, the content of which is hereby incorporated by reference in its entirety.

TECHNICAL FIELD

The present disclosure belongs to the field of display technology, and particularly relates to a backlight module and a display device.

BACKGROUND

In a direct type backlight module, a blue light diode is adopted to cooperate with a quantum dot film, so that picture quality with a high color gamut can be achieved. However, light emitted from an edge of the quantum dot film has a bluish color, which results in that a picture displayed by the display device has a bluish edge.

SUMMARY

Embodiments of the present disclosure provide a backlight module and a display device.

As an aspect of the present disclosure, there is provided a backlight module including:

a light emitting element array including a plurality of light emitting elements that emit blue light;

a quantum dot film disposed on a light-emergent side of the light emitting element array and having a middle area and an edge area, the edge area surrounding the middle area; and a light conversion layer disposed on the light-emergent side of the light emitting element array, wherein an orthographic projection of the light conversion layer on the quantum dot film is in the edge area of the quantum dot film, a material of the light conversion layer includes a first light conversion material configured to emit red light under excitation of light from the light emitting element and a second light conversion material configured to emit green light under excitation of light from the light emitting element.

In some embodiments, the light conversion layer includes a plurality of light conversion units spaced apart from each other, a material of each of the plurality of light conversion units including the first light conversion material and the second light conversion material, wherein, a distribution density of the plurality of light conversion units is gradually increased along a direction from a center to an edge of the quantum dot film, and/or, volumes of the plurality of light conversion units are gradually increased along the direction from the center to the edge of the quantum dot film.

In some embodiments, a dimension of each of the plurality of light conversion units in a length direction of the quantum dot film and a dimension of the light conversion unit in a width direction of the quantum dot film are both between 5 µm and 100 µm; and a thickness of the light conversion unit is between 5 µm and 30 µm.

In some embodiments, the plurality of light conversion units are formed by screen printing.

In some embodiments, the orthographic projection of the light conversion layer on the quantum dot film completely covers the edge area of the quantum dot film.

In some embodiments, both the first light conversion material and the second light conversion material are quantum dot materials; or both the first light conversion material and the second light conversion material are phosphor materials.

In some embodiments, a distance between any two adjacent light emitting elements is between 1 mm and 1.5 mm, both a length and a width of each light emitting element are between 100 µm and 500 µm, a light emitting angle of each light emitting element is between 130° and 150°, a width of the edge area of the quantum dot film is between 3 mm and 5 mm, and the orthographic projection of the light conversion layer on the quantum dot film is in contact with each side edge of the middle area and in contact with each side edge of the quantum dot film.

In some embodiments, the quantum dot film includes: a first barrier film layer, a second barrier film layer and a quantum dot layer between the first barrier film layer and the second barrier film layer, a material of the quantum dot layer includes a red quantum dot material configured to emit red light under excitation of light from the light emitting element and a green quantum dot material configured to emit green light under excitation of light from the light emitting element.

In some embodiments, the light emitting elements are light emitting diodes.

As another aspect of the present disclosure, there is provided a display device including: a backlight module and a liquid crystal display panel on a light-emergent side of the backlight module, wherein the backlight module is the backlight module in the above embodiments.

In some embodiments, the liquid crystal display panel includes: a liquid crystal cell and a polarizer between the liquid crystal cell and the backlight module, the backlight module further includes:

a diffuser on a light-emergent side of the light emitting element array; and a prism sheet on a side of the quantum dot film away from the light emitting element array, the diffuser being between the light emitting element array and the prism sheet;

wherein the light conversion layer is on any one of the polarizer, the diffuser, the quantum dot film, and the prism sheet.

BRIEF DESCRIPTION OF THE DRAWINGS

The accompanying drawings, which serve to provide a further understanding of the present disclosure and constitute a part of the specification, are used for explaining the present disclosure together with the following specific implementations, rather than limiting the present disclosure. In the drawings:

FIG. 10b is an enlarged view of an area Q1 in FIG. 10a.

FIG. 11b is an enlarged view of an area Q2 in FIG. 11a.

DETAILED DESCRIPTION

Figure 1:
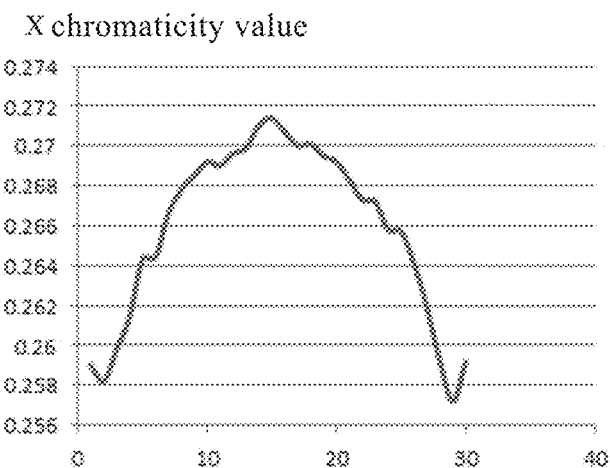
FIG. 1 is a schematic diagram illustrating X chromaticity values of a test picture of a display device in a comparative example.

To make the objects, technical solutions and advantages of the embodiments of the present disclosure more apparent, the technical solutions of the embodiments of the present disclosure will be clearly and thoroughly described below with reference to the drawings of the embodiments of the present disclosure. Apparently, the described embodiments are only a part, but not all, of embodiments of the present disclosure. All other embodiments that can be derived by a person skilled in the art from the described embodiments of the present disclosure without creative efforts are within the protection scope of the present disclosure.

Unless defined otherwise, technical or scientific terms used herein shall have their ordinary meanings as understood by one of ordinary skill in the art to which this disclosure belongs. The terms "first," "second," and the like used in the description and claims of the present disclosure do not denote any order, quantity, or importance, but are used to distinguish one component from another. Similarly, the terms "a", "an", and the like do not denote a limitation of quantity, but denote the presence of at least one. The term "include", "comprise", or the like means that the element or item preceding the term "include" or "comprise" includes the element(s) or item(s) listed after the term "include" or "comprise" and its equivalents, and does not exclude other elements or items. The terms "connected", "coupled" and the like are not restricted to physical or mechanical connections, but may include electrical connections, whether direct or indirect. The terms "upper", "lower", "left", "right", and the like are used merely to indicate relative positional relationships, and the relative positional relationships may change accordingly when the absolute position of the object being described changes.

In the following description, when an element or layer is referred to as being "on" or "connected to" another element or layer, it can be directly on or directly connected to the other element or layer, or intervening elements or layers may be present. However, when an element or layer is referred to as being "directly on" or "directly connected to" another element or layer, there are no intervening elements or layers.

The term "and/or" includes any and all combinations of one or more of the associated listed items.

In a liquid crystal display device, a backlight module provides a light source for a liquid crystal display panel, and after being deflected by the liquid crystal layer, light transmitted through each pixel can reach its corresponding target brightness, so as to realize picture display. A direct type backlight module can realize local lighting of the backlight module through a local dimming control technology, so as to improve display contrast. Meanwhile, display effect with high color gamut can be realized by using a blue light LED (light emitting diode) to work with a quantum dot film to generate white light. A quantum dot material in the quantum dot film absorbs blue light having relatively short wavelength and relatively high energy and emits red light and green light having relatively long wavelengths and relatively low energy, and the red light, the green light and the blue light which directly passes through the quantum dot film are mixed to generate white light.

Figure 2:
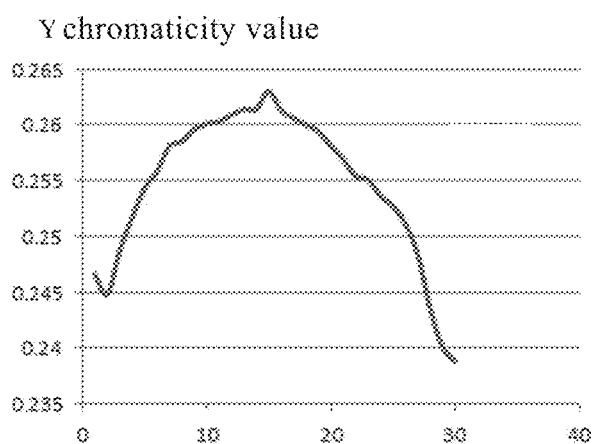
FIG. 2 is a schematic diagram illustrating Y chromaticity values of a test picture of a display device in a comparative example.

However, in practical applications, light emitted from an edge of the backlight module is bluish, which causes a display picture to have a bluish edge, and thus display effect is affected. FIG. 1 is a schematic diagram illustrating X chromaticity values of a test picture of a display device in a comparative example, and FIG. 2 is a schematic diagram illustrating Y chromaticity values of the test picture of the display device in the comparative example, where the test picture is a white test picture, a curve shown in FIG. 1 represents a relation curve between X chromaticity values of test points and positions of the test points, and a curve shown in FIG. 2 represents a relation curve between Y chromaticity values of test points and positions of the test points. The horizontal axes in FIG. 1 and FIG. 2 represent a horizontal coordinate of the position of each test point, the vertical axis in FIG. 1 represents the X chromaticity value, the vertical axis in FIG. 2 represents the Y chromaticity value, and every test point is located on a same test line, which transversely extends from a middle part of the display picture to both side edges. Left and right ends of each of the curves in FIGS. 1 and 2 correspond to test points at both ends of the test line, respectively. The X chromaticity value and the Y chromaticity value of the test point are respectively an X coordinate value and a Y coordinate value of the color of the test point in a CIE1931 chromaticity diagram.

Figure 3:
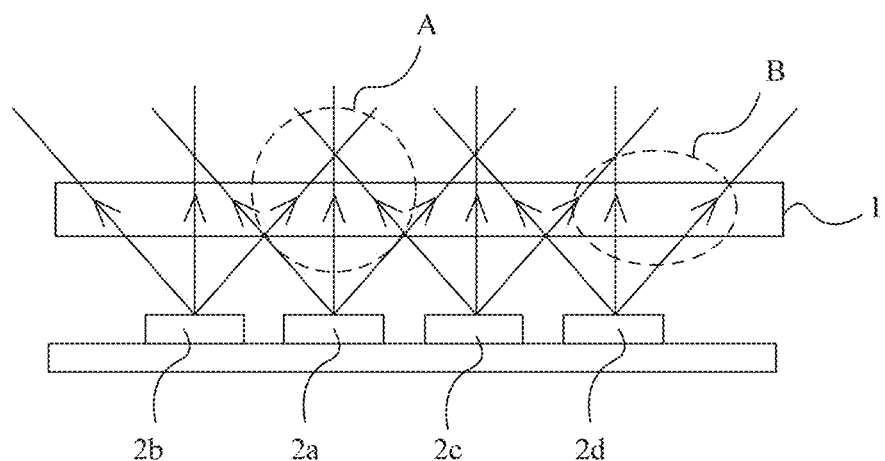
FIG. 3 is a schematic diagram illustrating principle that light emitted from an edge of a quantum dot film is bluish in a comparative example.

As shown in FIGS. 1 and 2, the X chromaticity value of the test point at the central position is greater than the X chromaticity value of the test point at the edge position, and the Y chromaticity value of the test point at the central position is greater than the Y chromaticity value of the test point at the edge position, and therefore, the display picture may have a bluish edge. The reason why the display picture has a bluish edge is that light emitted from the edge of the quantum dot film is bluish, FIG. 3 is a schematic diagram illustrating principle that light emitted from an edge of a quantum dot film is bluish in a comparative example, as shown in FIG. 3, a quantum dot material in a middle area A of the quantum dot film 1 is excited by part of blue light emitted by an LED 2a directly opposite thereto to emit red light and green light; meanwhile, the quantum dot material in the middle area A is also excited by part of blue light emitted by LEDs 2b and 2c on both sides of the LED 2a to emit red light and green light, therefore, light in the middle area A is formed by mixing the blue light emitted and the red and green light excited by the LED 2a and the red and green light excited and a small amount of blue light emitted by the LEDs 2b and 2c on both sides of and adjacent to the LED 2a. The quantum dot material in an edge area B is excited by part of blue light emitted by an LED 2*d* directly opposite thereto to emit red light and green light; meanwhile, the quantum dot material in the edge area B is also excited by blue light from the LED 2*c* on one side of and adjacent to the LED 2*d* to emit red light and green light. As compared with the middle area, there is no LED at the other side of and adjacent to the LED 2*d* for excitation in the edge area B, so that less red and green light is emitted, and thus the overall light color of the edge area is bluish.

Figure 4:
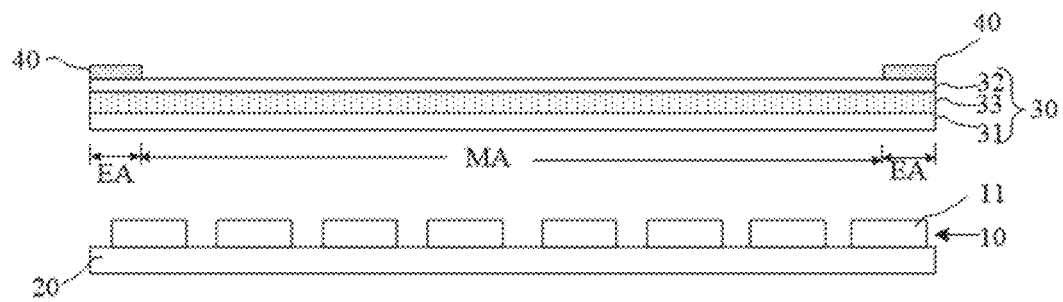
FIG. 4 is a schematic diagram of a backlight module provided in an embodiment of the present disclosure.

FIG. 4 is a schematic diagram of a backlight module provided in an embodiment of the present disclosure, and as shown in FIG. 4, the backlight module includes: a light emitting element array 10, a quantum dot film 30, and a light conversion layer 40. The light emitting element array 10 includes a plurality of light emitting elements 11 that emit blue light. Optionally, the light emitting element array 10 is disposed on a base substrate 20 provided with a signal line through which a driving signal from a driving chip is received. The quantum dot film 30 is disposed on a light-emergent side of the light emitting element array 10 and has a middle area MA and an edge area EA surrounding the middle area. Optionally, a surface of the quantum dot film 30 facing the light emitting element array 10 and a surface of the quantum dot film 30 away from the light emitting element array 10 are in the shape of a rectangle, and the middle area MA is in the shape of a rectangle. The light conversion layer 40 is disposed on the light-emergent side of the light emitting element array 10, and an orthographic projection of the light conversion layer 40 on the quantum dot film 30 is located in the edge area EA of the quantum dot film 30. A material of the light conversion layer 40 includes a first light conversion material for emitting red light under excitation of light from a light emitting element 11 and a second light conversion material for emitting green light under excitation of light from a light emitting element 11.

Optionally, the light conversion layer 40 may be located between the quantum dot film 30 and the light emitting element array 10, or may be located on a side of the quantum dot film 30 away from the light emitting element array 10.

In an embodiment of the present disclosure, because the orthographic projection of the light conversion layer 40 on the quantum dot film 30 is located in the edge area EA of the quantum dot film 30, the quantum dot material in the edge area EA of the quantum dot film 30 can generate red light and green light under excitation of blue light, and in addition, the first light conversion material of the light conversion layer 40 can also generate red light and green light under excitation of blue light. Compared with FIG. 1, more red light and green light is emitted from an edge area of the backlight module in the embodiment of the present disclosure, so that light chromaticity in the edge area can be compensated for, and the phenomenon that the light emitted from the edge area of the backlight module is bluish is alleviated.

Optionally, the light emitting element 11 is a light emitting diode, such as a Mini-LED (Mini light emitting diode) or a Micro-LED (Micro light emitting diode).

Optionally, the first light conversion material and the second light conversion material are both quantum dot materials, or are both phosphor materials. The quantum dot material may be at least one of zinc oxide (ZnO), graphene, cadmium selenide (CdSe), cadmium sulfide (CdS), cadmium telluride (CdTe), zinc selenide (ZnSe), zinc telluride (ZnTe) or zinc sulfide (ZnS). The color of light emitted by the quantum dot material may be controlled by controlling a particle size of the quantum dot material. By taking zinc sulfide as an example of the quantum dot material, when the particle size of the quantum dot material is between 9 nm and 10 nm, red light can be emitted; when the particle size of the quantum dot material is between 6.5 nm and 7.5 nm, green light can be emitted.

In an embodiment of the present disclosure, the quantum dot film 30 includes: a first barrier film layer 31, a second barrier film layer 32 opposite to the first barrier film layer 31, and a quantum dot layer 33 located between the first barrier film layer 31 and the second barrier film layer 32. A material of the quantum dot layer 33 includes a red quantum dot material and a green quantum dot material. The red quantum dot material is configured to emit red light under excitation of light from the light emitting element 11; the green quantum dot material is configured to emit green light under excitation of light from the light emitting element 11. Both the red quantum dot material and the green quantum dot material may be at least one of zinc oxide (ZnO), graphene, cadmium selenide (CdSe), cadmium sulfide (CdS), cadmium telluride (CdTe), zinc selenide (ZnSe), zinc telluride (ZnTe) or zinc sulfide (ZnS). The color of light emitted by the quantum dot material may be controlled by controlling a particle size of the quantum dot material. For example, the red quantum dot material and the green quantum dot material are both zinc sulfide, and in this case, the particle size of the red quantum dot material is between 9 nm and 10 nm, so that red light is emitted; the particle size of the green quantum dot material is between 6.5 nm and 7.5 nm, so that green light is emitted. The red quantum dot material and the green quantum dot material are uniformly mixed in the quantum dot layer, so that the color of light emitted from the quantum dot film 30 is uniformly distributed.

Optionally, the first barrier film layer 31 and the second barrier film layer 32 are made of an organic material, for example, polyethylene terephthalate (PET).

Figure 5:
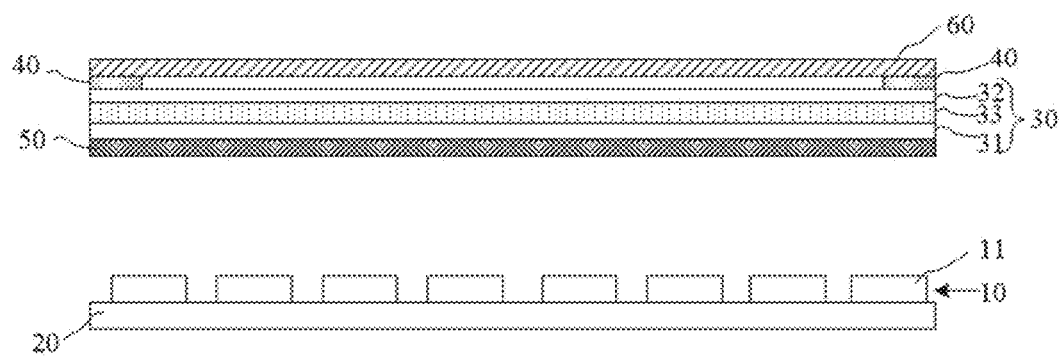
FIG. 5 is a schematic diagram of a backlight module provided in some other embodiments of the present disclosure.

FIG. 5 is a schematic diagram of a backlight module according to another embodiment of the present disclosure, and as shown in FIG. 5, the backlight module further includes: a diffuser 50 and a prism sheet 60. The diffuser 50 is disposed on the light-emergent side of the light emitting element array 10, so as to make the light emitted from the backlight module more uniformly distributed. Optionally, the diffuser 50 is disposed between the light emitting element array 10 and the quantum dot film 30, or on a side of the quantum dot film 30 away from the light emitting element array 10. The prism sheet 60 is disposed on a side of the quantum dot film 30 away from the light emitting element array 10, and the diffuser 50 is disposed between the light emitting element array 10 and the prism sheet. The prism sheet 60 serves to improve front luminance of the display device.

In an embodiment of the present disclosure, the light conversion layer 40 may be disposed directly on any one of the diffuser 50, the prism sheet 60, and the quantum dot film 30.

An embodiment of the present disclosure is described by taking a case where the light conversion layer 40 is disposed on the quantum dot film 30 as an example. In the embodiment, the light conversion layer 40 may be disposed on a surface of the quantum dot film 30 close to the light emitting element array 10, or may be disposed on a surface of the quantum dot film 30 away from the light emitting element array 10.

Figure 6:
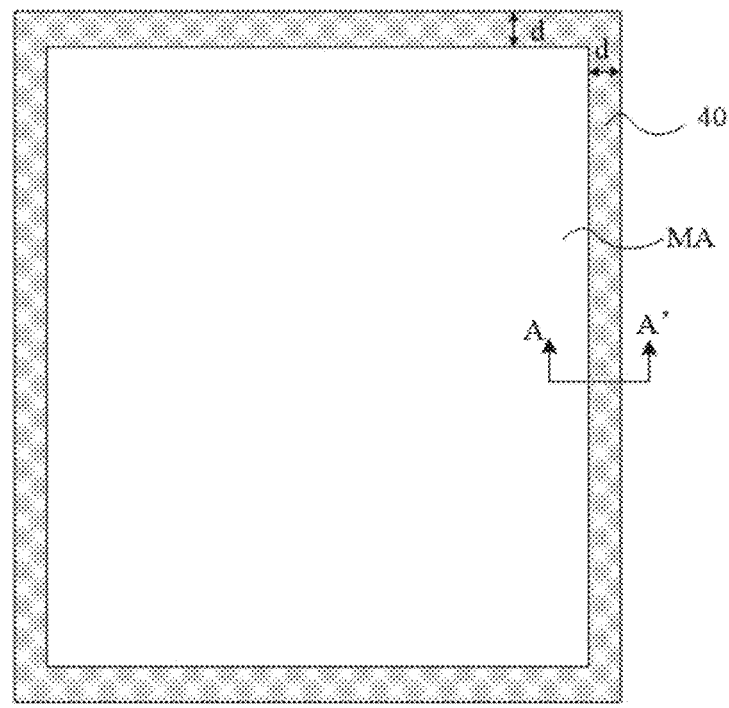
FIG. 6 is a top view of a light conversion layer provided in some embodiments of the present disclosure.
Figure 7:
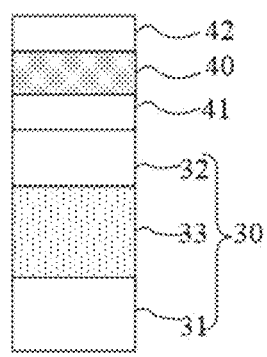
FIG. 7 is a cross-sectional view taken along line A-A' in FIG. 6.

FIG. 6 is a top view of a light conversion layer provided in some embodiments of the present disclosure, and as shown in FIG. 6, an orthographic projection of the light conversion layer 40 on the quantum dot film 30 completely covers the edge area of the quantum dot film 30, so as to form a continuous ring-shaped layer. It should be noted that the "ring-shape" does not necessarily mean a circular ring-shape, and may be any shape that is continuous and surrounds the middle area. For example, the middle area is rectangular, and both an inner boundary and an outer boundary of the light conversion layer 40 are rectangular. FIG. 7 is a cross-sectional view taken along line A-A' in FIG. 6, and as shown in FIG. 7, the backlight module further includes: a third barrier film layer 41 and a fourth barrier film layer 42 opposite to the third barrier film layer 41, and the light conversion layer 40 is disposed between the third barrier film layer 41 and the fourth barrier film layer 42. The light conversion layer 40 is a continuous ring-shaped layer. For ease of production, a specific material of the light conversion layer 40 may be the same as the specific material of the quantum dot layer 33 in the quantum dot film 30, that is, the light conversion layer 40 includes a red quantum dot material and a green quantum dot material, and a ratio of the content of the red quantum dot material to the content of the green quantum dot material in the light conversion layer 40 is substantially equal to a ratio of the content of the red quantum dot material to the content of the green quantum dot material in the quantum dot layer.

Optionally, when the light conversion layer 40 is disposed on the side of the quantum dot film 30 away from the light emitting element array 10, the third barrier film layer 41 and the second barrier film layer 32 may be formed as a single piece, and when the light conversion layer 40 is disposed on the side of the quantum dot film 30 facing the light emitting element array 10, the fourth barrier film layer 42 and the first barrier film layer 31 may be formed as a single piece.

Figure 8:
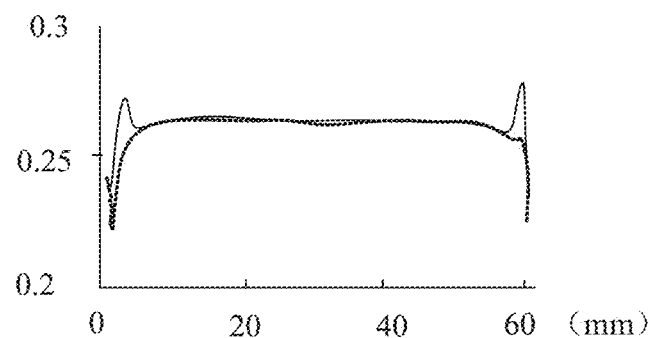
FIG. 8 is a graph illustrating comparison of X chromaticity values between a case where a backlight module is not provided with a light conversion layer and a case where the backlight module is provided with the light conversion layer shown in FIG. 6.
Figure 9:
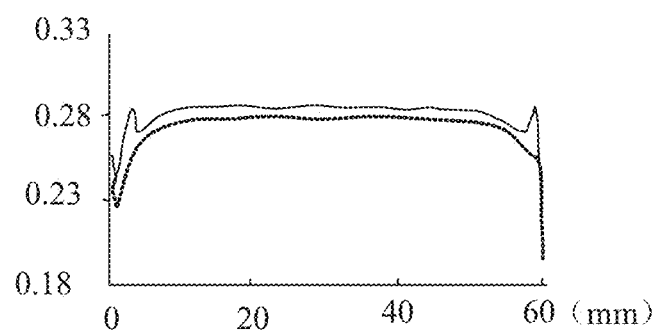
FIG. 9 is a graph illustrating comparison of Y chromaticity values between a case where a backlight module is not provided with a light conversion layer and a case where the backlight module is provided with the light conversion layer shown in FIG. 6.

FIG. 8 is a graph illustrating comparison of X chromaticity values between a case where a backlight module is not provided with a light conversion layer and a case where the backlight module is provided with the light conversion layer shown in FIG. 6, and FIG. 9 is a graph illustrating comparison of Y chromaticity values between a case where a backlight module is not provided with a light conversion layer and a case where the backlight module is provided with the light conversion layer shown in FIG. 6. In FIG. 8, a solid line represents a relation curve between X chromaticity values of test points in a test picture and positions of the test points after a backlight module is provided with the light conversion layer 40 in FIG. 6, and a dotted line represents a relation curve between X chromaticity values of the test points and the positions of the test points in the absence of the light conversion layer 40; in FIG. 9, a solid line represents a relation curve between Y chromaticity values of test points and positions of the test points after a backlight module is provided with the light conversion layer 40 in FIG. 6, and a dotted line represents a relation curve between Y chromaticity values of the test points and the positions of the test points in the absence of the light conversion layer 40. Horizontal axes in FIGS. 8 and 9 represents a horizontal coordinate of the position of each test point, a vertical axis of FIG. 8 represents the X chromaticity value, a vertical axis of FIG. 9 represents the Y chromaticity value, and every test point is located on one test line transversely extending from a middle part of the display picture to both side edges.

As can be seen from FIGS. 8 and 9, after the light conversion layer 40 shown in FIG. 6 is disposed, as shown in FIGS. 8 and 9, the chromaticity value of an edge position of the test line (i.e., edge position of the display picture) is increased, that is, the color of the edge position of the display picture is compensated for, so that the phenomenon of a bluish edge in FIG. 3 does not occur. However, after the light conversion layer 40 shown in FIG. 6 is provided, color overcompensation is likely to occur. To prevent this, another structure of the light conversion layer 40 is provided in an embodiment of the present disclosure.

Figure 10A:
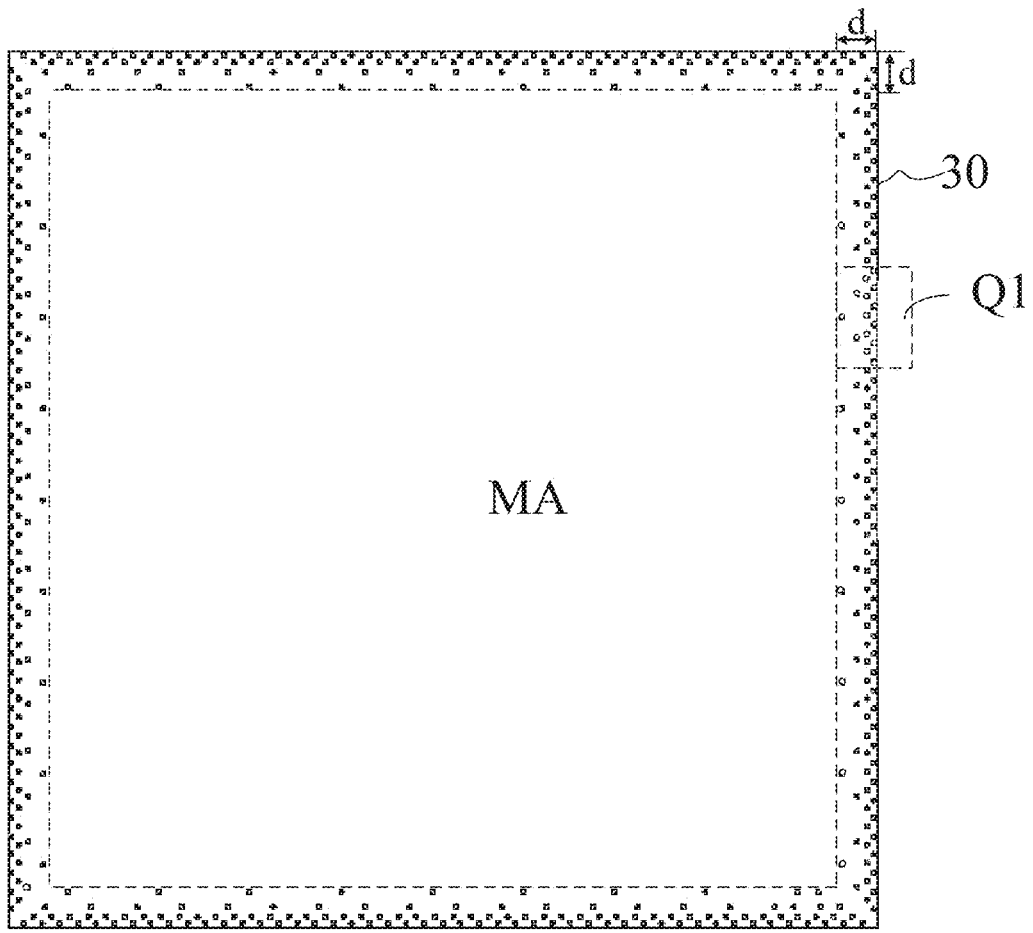
FIG. 10a is a top view of a light conversion layer provided in some other embodiments of the present disclosure.
Figure 10B:
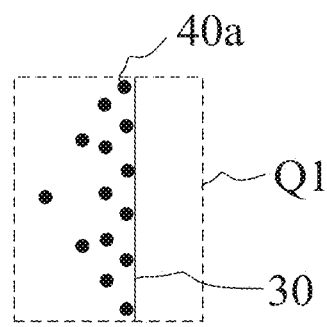

FIG. 10*a* is a top view of a light conversion layer provided in some other embodiments of the present disclosure and FIG. 10*b* is an enlarged view of an area Q1 in FIG. 10*a*, and as shown in FIGS. 10*a* and 10*b*, the light conversion layer 40 includes a plurality of light conversion units 40*a* spaced apart from each other, and a material of each light conversion unit 40*a* includes a first light conversion material and a second light conversion material. The first light conversion material and the second light conversion material in the light conversion unit 40*a* are uniformly mixed. Optionally, volume percentages of the first light conversion materials in different light conversion units 40*a* are the same, and volume percentages of the second light conversion materials in different light conversion units 40*a* are also the same. For example, the material of the light conversion unit 40*a* is the same as the material of the quantum dot layer 33 in the quantum dot film 30, the volume percentage of the first light conversion material in each light conversion unit 40*a* is the same as the volume percentage of the red quantum dot material in the quantum dot layer 33, and the volume percentage of the second light conversion material in each light conversion unit 40*a* is the same as the volume percentage of the green quantum dot material in the quantum dot layer 33.

As shown in FIGS. 10*a* and 10*b*, each light conversion unit 40*a* may have a same volume. The distribution density of the light conversion units 40*a* gradually increases along a direction from the center to the edge of the quantum dot film 30. In the edge area of the quantum dot film 30, amounts of light irradiated to different positions from the light emitting element array 10 are different, and the farther from the center of the quantum dot film 30, the less amount of light received. In the arrangement of FIG. 10*a*, the plurality of light conversion units 40*a* in the light conversion layer 40 are spaced apart from each other, and the farther away from the center of the quantum dot film 30, the more densely the light conversion units 40*a* are distributed, so as to emit more red light and green light. Therefore, by adopting the arrangement in FIG. 10*a*, the light conversion layer 40 can alleviate the phenomenon that light emitted from the edge area of the backlight module is bluish, and make the chromaticity of light emitted from the entire light emitting area of the backlight module more uniform.

In some specific examples, the plurality of light conversion units 40*a* are divided into a plurality of light conversion unit groups, orthographic projections of different light conversion unit groups on the quantum dot film 30 are located on different sides of the middle area MA, each light conversion unit group includes a plurality of rows of light conversion units 30*a*, each row includes a plurality of light conversion units 30*a*, and the plurality of light conversion units 30*a* in each row are arranged along an extending direction of an edge of the middle area MA. For example, as shown in FIG. 10*a*, the plurality of light conversion units 40*a* are divided into four light conversion unit groups, which are located on four sides, i.e., the upper, lower, left, and right sides, of the middle area MA, respectively. In the light conversion unit groups on the upper and lower sides, the plurality of light conversion units 30*a* in each row of light conversion units 30*a* are arranged along the extending direction of the upper edge of the middle area MA; in the light conversion unit groups on the left and right sides, the plurality of light conversion units 30*a* in each row of light conversion units 30*a* are arranged along the extending direction of the left edge of the middle area MA. Optionally, the distribution densities of the light conversion units 30a in respective rows of light conversion units 30a gradually increase in a direction away from the middle area MA.

Figure 11A:
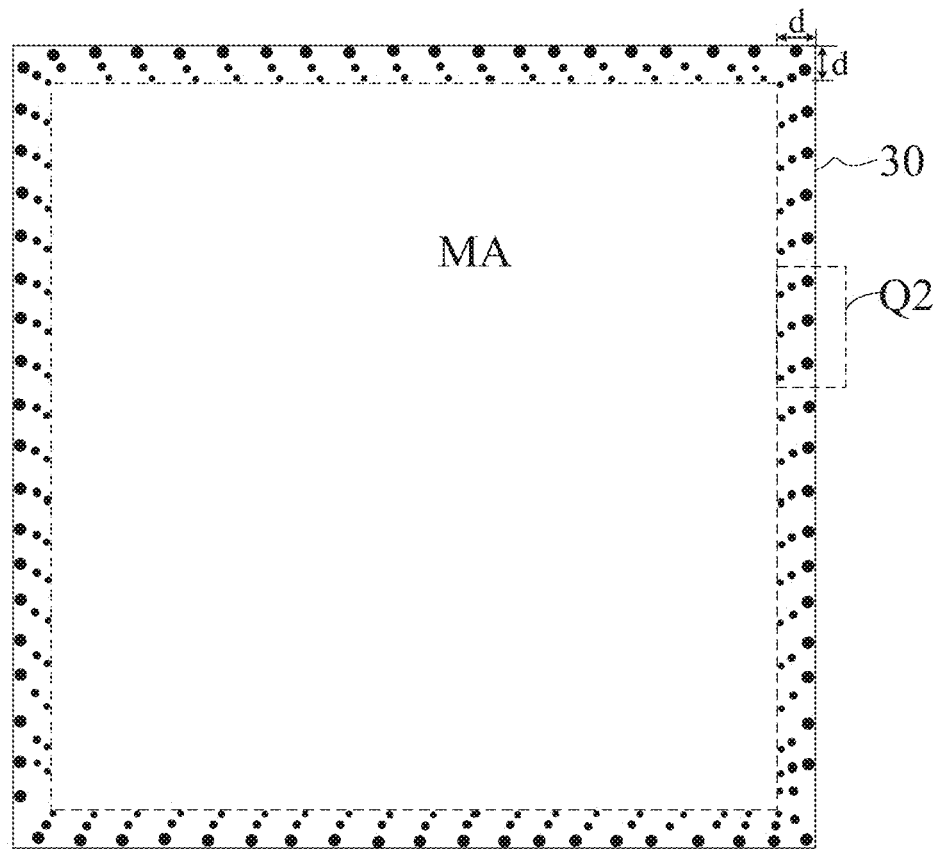
FIG. 11a is a top view of a light conversion layer provided in some other embodiments of the present disclosure.
Figure 11B:
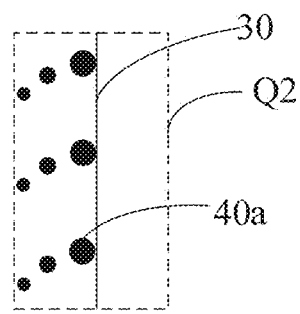

FIG. 11a is a top view of a light conversion layer provided in still some other embodiments of the present disclosure, and FIG. 11b is an enlarged view of an area Q2 in FIG. 11a, and as shown in FIGS. 11a and 11b, the light conversion layer 40 includes a plurality of light conversion units 40a spaced apart from each other, and a material of each light conversion unit 40a includes a first light conversion material and a second light conversion material. The first light conversion material and the second light conversion material in the light conversion unit 40a are uniformly mixed. Unlike the structure shown in FIG. 10a, in FIGS. 11a and 11b, volumes of the light conversion units 40a gradually increase along a direction from the center to the edge of the quantum dot film 30. For example, as shown in FIG. 11a, a plurality of rows of light conversion units 40a are provided on both upper and lower sides of the middle area MA, and the number of the light conversion units 40a in each row is substantially the same; a plurality of columns of light conversion units 40a are provided on both left and right sides of the middle area MA, and the number of the light conversion units 40a in each column is substantially the same.

In the arrangement of FIGS. 11a and 11b, the farther from the center of the quantum dot film 30, the larger the volume of the light conversion unit 40a is, so as to emit more red light and green light. Therefore, by adopting the arrangement of FIG. 11a, the light conversion layer 40 can alleviate the phenomenon that light emitted from the edge area of the backlight module is bluish, and make the chromaticity of light emitted from the entire light emitting area of the backlight module more uniform.

Of course, the arrangements of FIGS. 10a and 11a may be combined, that is, along the direction from the center to the edge of the quantum dot film 30, the volumes of the light conversion units 40a are gradually increased, and in the meanwhile, the distribution density of the light conversion units 40a is gradually increased.

Optionally, in the arrangements of FIGS. 10a and 11a, the light conversion units 40a are formed by screen printing, thereby improving production efficiency. For example, the light conversion units 40a are formed on the quantum dot film 30 by screen printing. For example, the light conversion units 40a may be formed on a surface of the diffuser 50 or the prism sheet 60 by screen printing.

In the arrangements of FIGS. 10a and 11a, each light conversion unit 40a has a substantially same thickness, thereby facilitating uniform fabrication. Optionally, the thickness of each light conversion unit 40a is between 5 μm and 30 μm. For example, the thickness of the light conversion unit 40a is 10 μm, or 12 μm, or 15 μm, or 18 μm, or 20 μm.

In addition, a shape of the light conversion unit 40a is not limited in the embodiment of the present disclosure, and for example, a shape of an orthographic projection of the light conversion unit 40a on the quantum dot film 30 is any one of a circle, an ellipse, a triangle, a polygon, and the like, and may also be other irregular shape. Optionally, dimensions of the light conversion unit 40a in a length direction and a width direction of the quantum dot film 30 are both between 5 μm and 100 μm. For example, the light conversion unit 40a has a circular shape, and a diameter of the light conversion unit 40a is about 20 μm, or about 30 μm, or about 40 μm, or about 50 μm, or about 60 μm, or about 70 μm, or about 80 μm, or about 90 μm.

Figure 12:
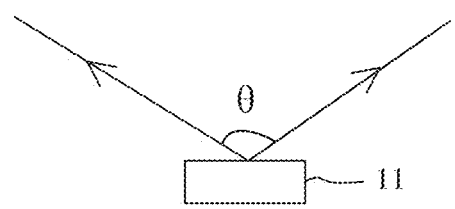
FIG. 12 is a schematic diagram of emergent light of a light emitting element provided in some embodiments of the present disclosure.

In some specific examples, the backlight module may be used in a small-sized display device, a length and a width of the light emitting element 11 are both between 100 μm and 500 μm, a distance between any two adjacent light emitting elements 11 is between 1 mm and 1.5 mm, and a light emitting angle of the light emitting element 11 is between 130° and 150°. For example, the light emitting angle of the light emitting element 11 is 140°. FIG. 12 is a schematic diagram of emergent light of a light emitting element provided in some embodiments of the present disclosure, as shown in FIG. 12, light rays emitted from the light emitting element 11 form a divergent light beam, and the light emitting angle of the light emitting element 11 is a divergent angle θ of the divergent light beam. For a small-sized display device, as shown in FIGS. 6, 10a and 11a, a width d of the edge area of the quantum dot film 30 is between 3 mm and 5 mm, and the orthographic projection of the light conversion layer 40 on the quantum dot film 30 is in contact with each side edge of the middle area MA and in contact with each side edge of the quantum dot film 30. For the light conversion layer 40 in FIG. 6, the orthographic projection of the light conversion layer 40 on the quantum dot film 30 completely covers the edge area, and when the light conversion layer 40 includes a plurality of light conversion units 40a, as shown in FIGS. 10a and 11a, the upper edge of the middle area MA is in contact with one row of light conversion units 40a on the upper side of and adjacent to the middle area, the lower edge of the middle area MA is in contact with one row of light conversion units 40a on the lower side of and adjacent to the middle area, the left edge of the middle area MA is in contact with one column of light conversion units 40a on the left side of and adjacent to the middle area MA, and the right edge of the middle area MA is in contact with one column of light conversion units 40a on the right side of and adjacent to the middle area MA.

Figure 13:
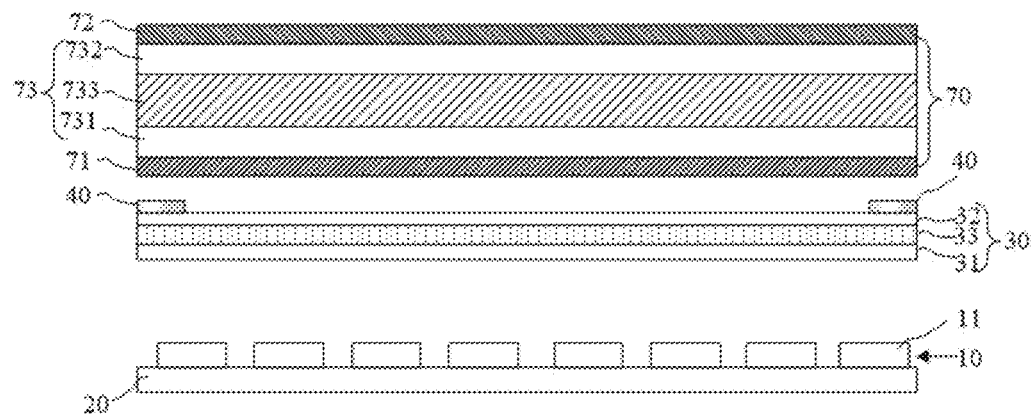
FIG. 13 is a schematic diagram of a display device provided in some embodiments of the present disclosure.

FIG. 13 is a schematic diagram of a display device provided in some embodiments of the present disclosure, as shown in FIG. 13, the display device includes a liquid crystal display panel 70 and a backlight module provided in the embodiments, and the liquid crystal display panel 70 is disposed on a light-emergent side of the backlight module.

Optionally, the liquid crystal display panel 70 includes: a liquid crystal cell 73, a polarizer 71, and a polarizer 72, and the liquid crystal cell 73 includes: an array substrate 731, a counter substrate 732 disposed opposite to the array substrate 731, and a liquid crystal layer 733 disposed between the array substrate 731 and the counter substrate 732. The polarizer 71 is disposed between the liquid crystal cell 73 and the backlight module, and the polarizer 72 is disposed on a side of the liquid crystal cell 73 away from the backlight module. Optionally, a polarization direction of the polarizer 71 is opposite to a polarization direction of the polarizer 72. Light emitted from the backlight module is circularly polarized light, and turns into linearly polarized light after being subjected to polarization of the polarizer 71. By applying an electric field to the liquid crystal layer 733, a direction of deflection of liquid crystal can be adjusted, so as to adjust the polarization direction of the linearly polarized light, and further adjust transmittance of the linearly polarized light when it transmits through the polarizer 72, thereby adjusting luminance of emitted light.

As described above, in some embodiments, the light conversion layer 40 is disposed on any one of the diffuser 50, the prism sheet 60, and the quantum dot film 30, but the arrangement of the light conversion layer 40 in the present disclosure is not limited thereto, for example, the light conversion layer 40 may be disposed directly on the polarizer 71, for example, on a side of the polarizer 71 facing the backlight module.

The display device may be any product or component with a display function, such as a liquid crystal display, a mobile phone, a tablet computer, a television, a notebook computer, a digital photo frame, a navigator or the like.

In the embodiments of the present disclosure, the backlight module includes the light conversion layer, and the orthographic projection of the light conversion layer on the quantum dot film is located in the edge area of the quantum dot film and can emit red light and green light after being excited by light from the light emitting element, so that the phenomenon that light emitted from the edge of the backlight module is bluish can be alleviated, thus the phenomenon that a display picture of the display device has a blue edge can be alleviated, and the chromaticity uniformity of the display picture can be improved.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

The invention claimed is:

1. A backlight module, comprising:
a light emitting element array comprising a plurality of light emitting elements that emit blue light;
a quantum dot film disposed on a light-emergent side of the light emitting element array and having a middle area and an edge area, the edge area surrounding the middle area; and
a light conversion layer disposed on the light-emergent side of the light emitting element array, wherein an orthographic projection of the light conversion layer on the quantum dot film is in the edge area of the quantum dot film, a material of the light conversion layer comprises a first light conversion material configured to emit red light under excitation of light from the light emitting element and a second light conversion material configured to emit green light under excitation of light from the light emitting element,
wherein the light conversion layer comprises a plurality of light conversion units spaced apart from each other, a material of each of the plurality of light conversion units comprises the first light conversion material and the second light conversion material, and
a distribution density of the plurality of light conversion units is gradually increased along a direction from a center to an edge of the quantum dot film.

2. The backlight module of claim 1, wherein a dimension of each of the plurality of light conversion unit in a width direction of the quantum dot film are both between 5 μm and 100 μm; and a thickness of the light conversion unit is between 4 μm and 30 μm.

3. The backlight module of claim 1, wherein the plurality of light conversion units are formed by screen printing.

4. The backlight module of claim 1, wherein the orthographic projection of the light conversion layer on the quantum dot film completely covers the edge area of the quantum dot film.

5. The backlight module of claim 1, wherein both the first light conversion material and the second light conversion material are quantum dot materials; or
both the first light conversion material and the second light conversion material are phosphor materials.

6. The backlight module of claim 1, wherein a distance between any two adjacent light emitting elements is between 1 mm and 1.5 mm, both a length and a width of each light emitting element are between 100 μm and 500 μm, a light emitting angle of each light emitting element is between 130° and 150°, a width of the edge area of the quantum dot film is between 3 mm and 5 mm, and the orthographic projection of the light conversion layer on the quantum dot film is in contact with each side edge of the middle area and in contact with each side edge of the quantum dot film.

7. The backlight module of claim 1, wherein the quantum dot film comprises: a first barrier film layer, a second barrier film layer and a quantum dot layer between the first barrier film layer and the second barrier film layer, and a material of the quantum dot layer comprises a red quantum dot material configured to emit red light under excitation of light from the light emitting element and a green quantum dot material configured to emit green light under excitation of light from the light emitting element.

8. The backlight module of claim 1, wherein the light emitting element is a light emitting diode.

9. A display device comprising: a backlight module and a liquid crystal display panel on a light-emergent side of the backlight module, wherein the backlight module is the backlight module of claim 1.

10. The display device of claim 9, wherein the liquid crystal display panel comprises: a liquid crystal cell and a polarizer between the liquid crystal cell and the backlight module,
the backlight module further comprises:
a diffuser on the light-emergent side of the light emitting element array; and
a prism sheet on a side of the quantum dot film away from the light emitting element array, the diffuser being between the light emitting element array and the prism sheet;
wherein the light conversion layer is on any one of the polarizer, the diffuser, the quantum dot film, and the prism sheet.

11. A backlight module, comprising:
a light emitting element array comprising a plurality of light emitting elements that emit blue light;
a quantum dot film disposed on a light-emergent side of the light emitting element array and having a middle area and an edge area, the edge area surrounding the middle area; and
a light conversion layer disposed on the light-emergent side of the light emitting element array, wherein an orthographic projection of the light conversion layer on the quantum dot film is in the edge area of the quantum dot film, a material of the light conversion layer comprises a first light conversion material configured to emit red light under excitation of light from the light emitting element and a second light conversion material configured to emit green light under excitation of light from the light emitting element,
wherein the light conversion layer comprises a plurality of light conversion units spaced apart from each other, a material of each of the plurality of light conversion units comprises the first light conversion material and the second light conversion material, and volumes of the plurality of light conversion units are gradually increased along the direction from the center to the edge of the quantum dot film.

12. The backlight module of claim 1, wherein the light conversion layer comprises a plurality of light conversion units spaced apart from each other, a material of each of the plurality of light conversion units comprises the first light conversion material and the second light conversion material, wherein volumes of the plurality of light conversion units are gradually increased along the direction from the center to the edge of the quantum dot film.

13. The backlight module of claim 11, wherein a dimension of each of the plurality of light conversion units in a length direction of the quantum dot film and a dimension of the light conversion unit in a width direction of the quantum dot film are both between 5 µm and 100 µm; and a thickness of the light conversion unit is between 5 µm and 30 µm.

14. The backlight module of claim 12, wherein a dimension of each of the plurality of light conversion units in a length direction of the quantum dot film and a dimension of the light conversion unit in a width direction of the quantum dot film are both between 5 µm and 100 µm; and a thickness of the light conversion unit is between 5 µm and 30 µm.

15. The backlight module of claim 12, wherein both the first light conversion material and the second light conversion material are quantum dot materials; or
both the first light conversion material and the second light conversion material are phosphor materials.

16. The backlight module of claim 12, wherein a distance between any two adjacent light emitting elements is between 1 mm and 1.5 mm, both a length and a width of each light emitting element are between 100 µm and 500 µm, a light emitting angle of each light emitting element is between 130° and 150°, a width of the edge area of the quantum dot film is between 3 mm and 5 mm, and the orthographic projection of the light conversion layer on the quantum dot film is in contact with each side edge of the middle area and in contact with each side edge of the quantum dot film.

17. The backlight module of claim 12, wherein the quantum dot film comprises: a first barrier film layer, a second barrier film layer and a quantum dot layer between the first barrier film layer and the second barrier film layer, and a material of the quantum dot layer comprises a red quantum dot material configured to emit red light under excitation of light from the light emitting element and a green quantum dot material configured to emit green light under excitation of light from the light emitting element.

18. The backlight module of claim 14, wherein a distance between any two adjacent light emitting elements is between 1 mm and 1.5 mm, both a length and a width of each light emitting element are between 100 µm and 500 µm, a light emitting angle of each light emitting element is between 130° and 150°, a width of the edge area of the quantum dot film is between 3 mm and 5 mm, and the orthographic projection of the light conversion layer on the quantum dot film is in contact with each side edge of the middle area and in contact with each side edge of the quantum dot film.

19. The backlight module of claim 14, wherein the quantum dot film comprises: a first barrier film layer, a second barrier film layer and a quantum dot layer between the first barrier film layer and the second barrier film layer, and a material of the quantum dot layer comprises a red quantum dot material configured to emit red light under excitation of light from the light emitting element and a green quantum dot material configured to emit green light under excitation of light from the light emitting element.

* * * * *